(12) United States Patent
Kishida et al.

(10) Patent No.: US 12,066,408 B2
(45) Date of Patent: Aug. 20, 2024

(54) OPTICAL FIBER DISTRIBUTION MEASUREMENT SYSTEM AND SIGNAL PROCESSING METHOD FOR OPTICAL FIBER DISTRIBUTION MEASUREMENT

(71) Applicant: PETROLIAM NASIONAL BERHAD (PETRONAS), Kuala Lumpur (MY)

(72) Inventors: Kinzo Kishida, Kobe (JP); Ahmad Riza Ghazali, Kajang (MY); Mohamad Faizal Bin Abd Rahim, Kajang (MY)

(73) Assignee: PETROLIAM NASIONAL BERHAD (PETRONAS), Kuala Lumpur (MY)

(*) Notice: Subject to any disclaimer, the term of this patent is extended or adjusted under 35 U.S.C. 154(b) by 341 days.

(21) Appl. No.: 17/642,637

(22) PCT Filed: Sep. 11, 2020

(86) PCT No.: PCT/MY2020/050083
§ 371 (c)(1),
(2) Date: Mar. 11, 2022

(87) PCT Pub. No.: WO2021/049928
PCT Pub. Date: Mar. 18, 2021

(65) Prior Publication Data
US 2022/0349860 A1 Nov. 3, 2022

(30) Foreign Application Priority Data
Sep. 13, 2019 (MY) .......................... PI 2019005316

(51) Int. Cl.
*G01N 29/44* (2006.01)
*G01N 29/24* (2006.01)

(52) U.S. Cl.
CPC ..... *G01N 29/4436* (2013.01); *G01N 29/2418* (2013.01); *G01N 2291/02827* (2013.01); *G01N 2291/02881* (2013.01)

(58) Field of Classification Search
CPC .......... G01N 29/4436; G01N 29/2418; G01N 29/04; G01N 2291/02827; G01N 2291/02881; Y02A 90/10
See application file for complete search history.

(56) References Cited

U.S. PATENT DOCUMENTS 6,741,763 B1 * 5/2004 Taylor .............. H04B 10/25137
359/279
10,359,302 B2 7/2019 Hartog et al.
(Continued)

FOREIGN PATENT DOCUMENTS

CN 107340050 A * 11/2017 ............. G01H 9/004
JP 4134742 B2 * 8/2008 ............... H04B 7/08
(Continued)

OTHER PUBLICATIONS

International Search Report and Written Opinion of the International Search Authority issued in PCT/MY2020/050083, mailed Jan. 15, 2021; ISA/KR.

*Primary Examiner* — Catherine T. Rastovski
*Assistant Examiner* — Lal C Mang
(74) *Attorney, Agent, or Firm* — Harness, Dickey & Pierce, P.L.C.

(57) ABSTRACT

This optical fiber distribution measurement system of distributed optical fiber sensing type includes: a tunable wavelength distributed feedback LD (1) for obtaining a DTSS signal through frequency shift analysis; an external resonance laser (2) for obtaining a DAS signal through phase shift analysis; a pulse compression coding circuit (4) including an intensity modulator (4a) and an phase modulator (4b); an acousto-optic switch (5); an erbium doped optical fiber
(Continued)

amplifier (6); a circulator (7); a diversity device (8); a digitizer (11); a CPU (12); and a serial transfer interface (13). Through calculation on discrete signals sent from the digitizer (11), the CPU (12) converts an analyzed Rayleigh frequency shift signal obtained as the DTSS signal, to phase error, and corrects an analyzed phase signal obtained as the DAS signal, by the phase error.

5 Claims, 9 Drawing Sheets

(56) References Cited

U.S. PATENT DOCUMENTS

| | | | | |
|---|---|---|---|---|
| 2003/0193430 A1* | 10/2003 | Gresham | ............... | G01S 7/288 |
| | | | | 342/134 |
| 2011/0228255 A1* | 9/2011 | Li | ..................... | G01B 11/18 |
| | | | | 356/32 |
| 2017/0176221 A1* | 6/2017 | Hartog | .............. | G01D 5/35364 |
| 2018/0348086 A1* | 12/2018 | Lecoeuche | ......... | G01D 5/35361 |
| 2020/0032644 A1* | 1/2020 | Xia | ................... | G01D 5/35358 |

FOREIGN PATENT DOCUMENTS

| | | | | | |
|---|---|---|---|---|---|
| JP | | 2009115696 A | * | 5/2009 | ............ G01S 17/58 |
| WO | WO-2018-093368 A1 | | | 5/2018 | |

* cited by examiner

FIG. 1

TABLE 1

| | DTSS | DAS |
|---|---|---|
| LIGHT SOURCE | TUNABLE WAVELENGTH WIDEBAND LD | NARROW LINEWIDTH LD |
| FREQUENCY WIDTH ($\Delta f$) | SEVERAL HUNDRED THz | FIXED |
| FREQUENCY LINEWIDTH | 1 MHz OR LESS | < 2 kHz |
| SPATIAL RESOLUTION | 2 cm | SEVERAL m OR LESS |
| MEASUREMENT TIME | 30 s TO SEVERAL min | 0.01 TO 1 ms |
| MEASURED OPTICAL QUANTITY | Rayleigh SCATTERING FREQUENCY SHIFT | Rayleigh SCATTERING PHASE SHIFT |

OPTICAL FIBER DISTRIBUTION MEASUREMENT SYSTEM AND SIGNAL PROCESSING METHOD FOR OPTICAL FIBER DISTRIBUTION MEASUREMENT

CROSS-REFERENCE TO RELATED APPLICATIONS

This application is a U.S. National Phase Application under 35 U.S.C. 371 of International Application No. PCT/MY2020/050083, filed Sep. 11, 2020, which claims the benefit of priority from Malaysian Patent Application No. PI 2019005316, filed Sep. 13, 2019. The entire disclosures of the above applications are incorporated herein by reference.

TECHNICAL FIELD

The present disclosure relates to an optical fiber distribution measurement system and a signal processing method for optical fiber distribution measurement.

BACKGROUND ART

Regarding distributed fiber optic sensing (DFOS), various applications thereof, in particular, application to an oil well is attracting attention. In such applications, instantaneous change is effectively measured as an acoustic wave (acoustic vibration) by distributed acoustic sensing (DAS) (hereinafter, may be referred to as elastic wave measurement). As for temperature or strain that gradually changes, distributed temperature and strain sensing (DTSS) (hereinafter, may be referred to as temperature-strain distribution measurement) based on tunable wavelength coherent optical time domain reflectometry (TW-COTDR) (hereinafter, may be referred to as tunable-wavelength COTDR) is in practical use.

On the other hand, among users, there are a demand of usage in measurement over a long term from several days to several years, and a demand of usage in measurement of instantaneous operation change.

In addition, from a side of determining the specifications of measurement instruments, in particular, information for correcting error in phase change of Rayleigh scattering light to be measured by DAS is needed.

In a DAS technique, a time gate digital (TGD) method using a single pulse, multiple wavelengths, or a chirp light source has been proposed, and practical records thereof are being accumulated.

On the other hand, in a DTSS technique, a type using Brillouin scattering light and a type using Rayleigh scattering light are commercially available (see, for example, Non-Patent Literature 1). In the TW-COTDR method, a broad frequency spectrum of an optical fiber is used, and stability is ensured over several years (see, for example, Non-Patent Literature 2). In a distance of 10 km, 20000 measurements per second have been achieved.

The above techniques have each been commercially implemented in a single measurement instrument, and are each being developed for various applications.

CITATION LIST

Non-Patent Literature

Non-Patent Literature 1: Luca Palmieri, "Distributed polarimetric measurements for optical fiber sensing", Optical Fiber Technology 19, December 2013, pp. 720-728.

Non-Patent Literature 2: Andrea Galtarossa et al., "Distributed polarization sensing", Proc. SPIE 10323, 25th International Conference on Optical Fiber Sensors, 1032318, Apr. 23, 2017.

Non-Patent Literature 3: Toru Sato, "Distance measurement and pulse compression technique in radar", Kyoto University Graduate School of Informatics, Department of Communications and Computer Engineering, Integrated Systems Engineering Course, Field of Ultra-high-speed signal processing, Digital Signal Processing lecture materials.

Figure 1:
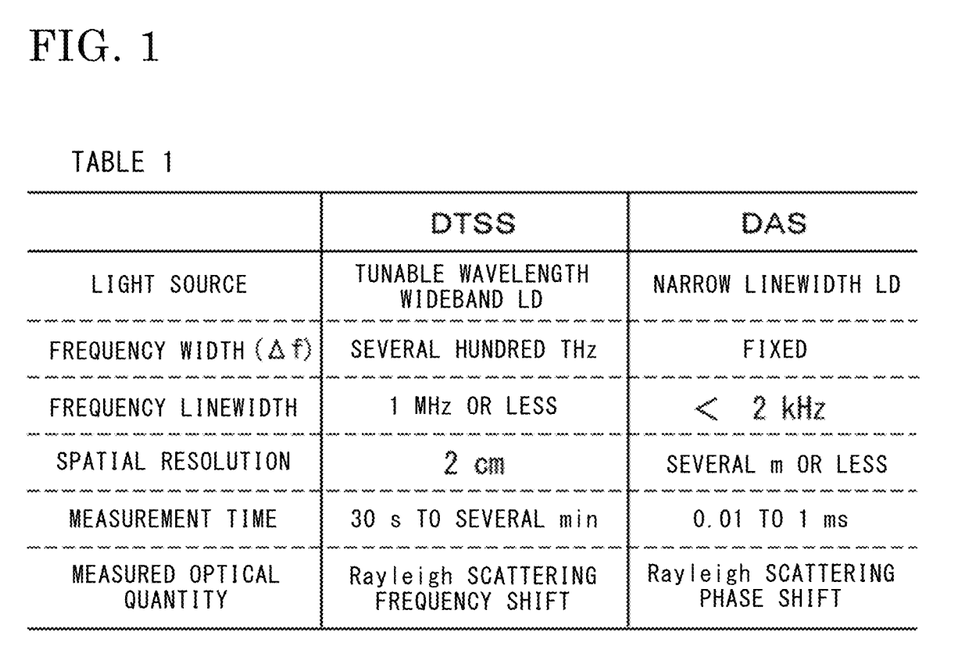
FIG. 1 is a table showing comparison between general features of DTSS and DAS.

Here, FIG. 1 shows the details of the features of the above techniques of DAS and DTSS. As is found from FIG. 1, in DTSS, an optical physical quantity to be measured is a Rayleigh scattering frequency shift, whereas in DAS, an optical physical quantity to be measured is a Rayleigh scattering phase shift. Due to the above type difference, as compared to the latter measurement method, the former measurement method has a lower spatial resolution and requires a longer measurement time. Thus, there is a difference in performance therebetween.

SUMMARY OF THE INVENTION

Problems to be Solved by the Invention

Technical problems of the above DAS and DTSS will be specifically described below. In DTSS, several seconds are required for measurement in a distance range of 10 km. Therefore, DTSS cannot be applied to detection of vibration or a seismic wave.

In DAS, as described above, a physical quantity to be measured is a Rayleigh scattering phase shift, and therefore it is necessary to measure a phase. Thus, there is a problem that a phase shift of Rayleigh scattering light occurs by phase noise of a laser diode (hereinafter, abbreviated as LD) itself due to linewidth, and temperature change or strain change affected when an optical fiber is installed at an actual site.

Figure 2:
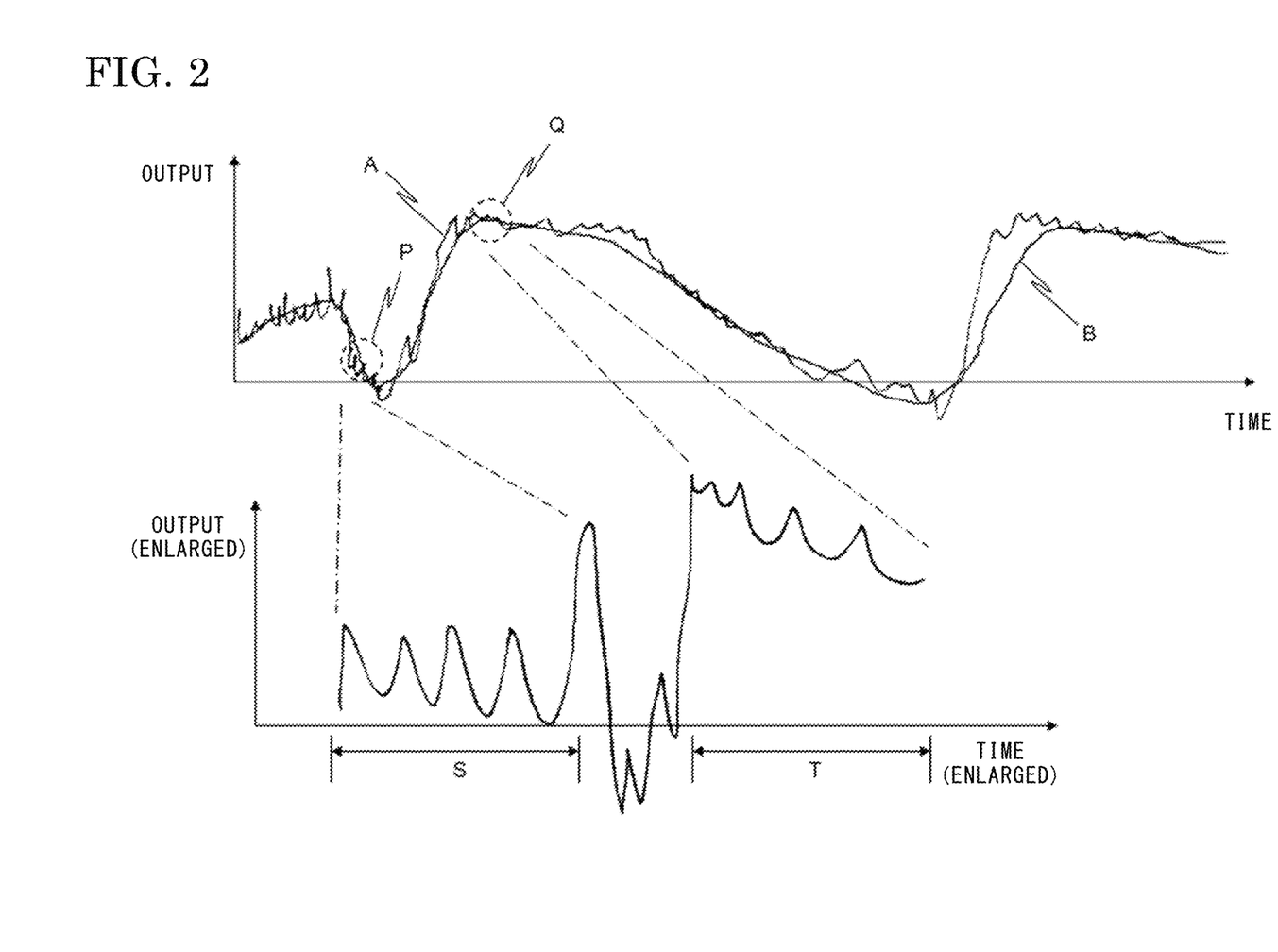
FIG. 2 shows an example of phase change in DAS.
Figure 3:
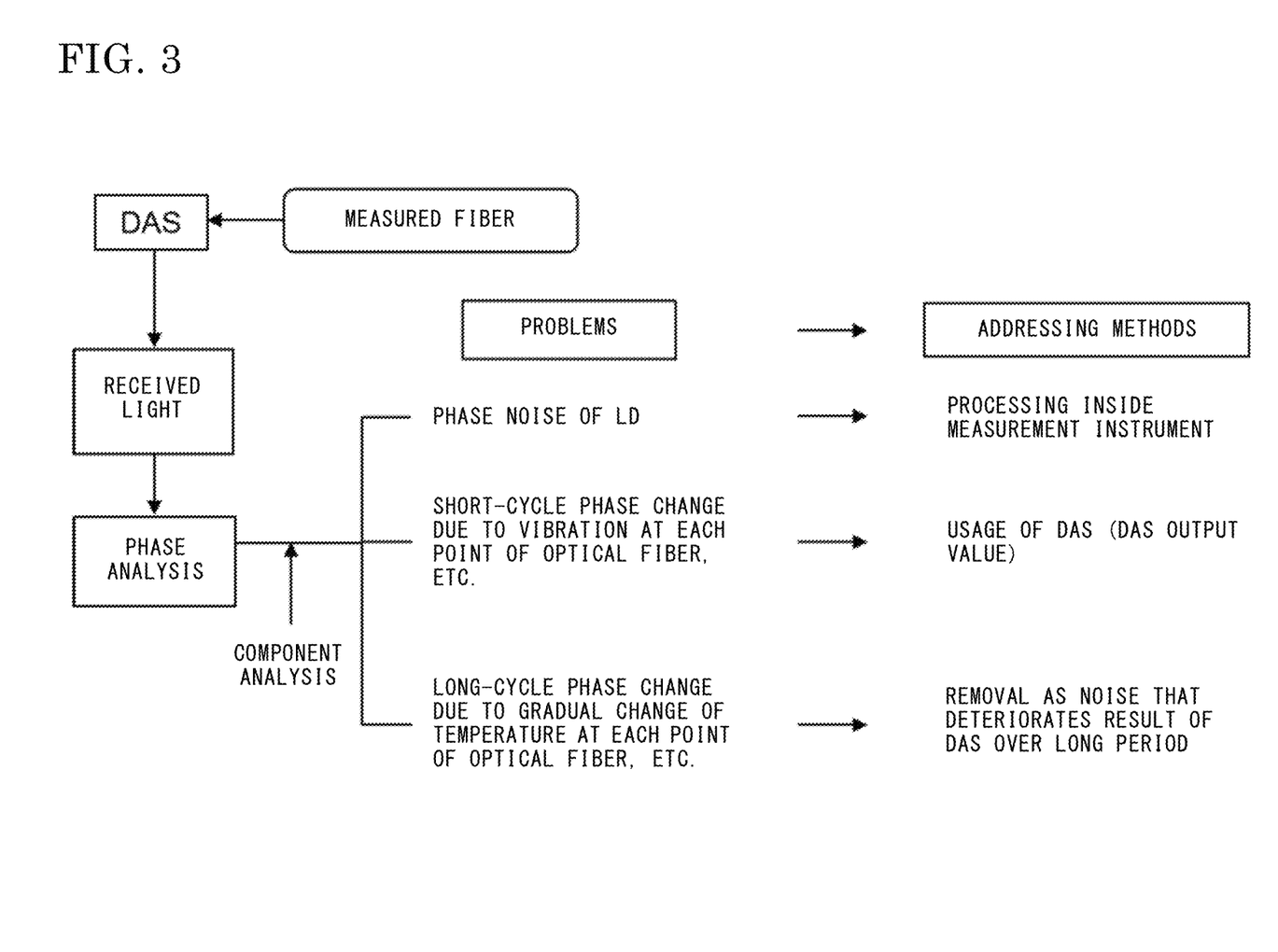
FIG. 3 illustrates problems of a DAS technique, classified on the basis of component analysis of phase change.

The above problems will be described in more detail, with reference to FIG. 2 and FIG. 3. FIG. 2 illustrates phase change in DAS measurement. FIG. 3 shows problems caused in the case of using DAS, for three patterns classified on the basis of component analysis of phase change.

FIG. 2 shows model graphs illustrating phase change of a signal measured by DAS measurement. The graph (the vertical axis indicates signal output and the horizontal axis indicates elapsed time) shown on the upper side in FIG. 2 shows a curve A of the measured phase change, and a curve B obtained by extracting only a long-cycle change part of the curve A.

In addition, for the purpose of focusing on only a short-cycle change part of the curve A, the graph shown on the lower side (the vertical axis and the horizontal axis are shown by enlarging the scales of the vertical axis and the horizontal axis of the graph shown on the upper side) shows, only in a time range from part P (left end time thereof) to part Q (right end time thereof) which are indicated by dotted-line circles in the graph shown on the upper side, a curve C indicating characteristics obtained by subtracting the values corresponding to the respective times in the curve B from the values corresponding to the respective times in the curve A, in which a fast change part of the phase change is specifically shown among others.

In the graph shown on the lower side, a time range S is obtained by enlarging a time range from the left end time to the right end time of part P in the graph shown on the upper side, and a time range T in the graph shown on the lower side is obtained by enlarging a time range from the left end time to the right end time of part Q in the graph shown on the upper side.

Here, the curve B is a part that exhibits gradual change over a period such as several ten seconds to several years, in the DAS measurement signal, and this part is considered to be attributable to the influence of temperature change or the like.

On the other hand, the curve C is a part that exhibits fast change within $10^{-5}$ to 1 [s], in the DAS measurement signal, and this part is considered to be generated by addition of LD phase noise to an acoustic wave signal.

Next, on the basis of FIG. 2, with reference to FIG. 3, problems in DAS measurement will be specifically described. The first problem is phase noise of the LD, and this problem is to be solved through internal processing in the DAS measurement instrument. The second problem is a problem of short-cycle phase change due to, for example, strain at each point of the optical fiber caused by vibration or the like. Regarding addressing of this problem, originally, this problem corresponds to the reason why the DAS measurement is preferentially used, and therefore can be solved by the DAS measurement. The third problem is a problem of long-cycle phase change caused by gradual change of temperature or the like. As the measurement is performed during a long period, the DAS measurement performance comes to no longer satisfy the specifications. Therefore, this needs to be eliminated.

The present disclosure has been made to solve the above problems, and an object of the present disclosure is to provide an optical fiber distribution measurement system and a signal processing method for optical fiber distribution measurement, in which DAS and DTSS based on TW-COTDR are combined, and, using a Rayleigh frequency shift measured by DTSS, a phase value in DAS is corrected at certain intervals longer than a measurement rate in the TW-COTDR method, thereby correcting error due to a Rayleigh scattering light shift which changes with a longer cycle than the DAS measurement rate, thus achieving measurement stability in DAS over a long period.

Solution to the Problems

An optical fiber distribution measurement system according to the present disclosure includes: a first laser for obtaining a temperature-strain distribution measurement signal through analysis of a frequency shift of Rayleigh scattering light; a second laser for obtaining an elastic wave measurement signal through analysis of a phase shift of Rayleigh scattering light; first to fourth optical couplers for branching or merging laser light; a pulse compression coding circuit including an intensity modulator for modulating an intensity of an optical signal and a phase modulator for modulating a phase of an optical signal, the intensity modulator and the phase modulator being connected in series; an acousto-optic switch for generating pulse light; a circulator for separating optical signals; a calibration optical fiber for generating backscatter light by receiving laser light; a diversity device for combining optical signals to remove noise; a digitizer for converting an input signal to a discrete signal; and a CPU which includes a processor and a storage device and which performs calculation on a signal and performs storage. Emitted light from the first laser is branched by the first optical coupler, so as to be inputted to the pulse compression coding circuit and the third optical coupler. Emitted light from the second laser is branched by the second optical coupler, so as to be inputted to the acousto-optic switch and the third optical coupler. The emitted light from the first laser and the emitted light from the second laser that have been inputted to the third optical coupler are inputted to the diversity device. An output signal from the pulse compression coding circuit and an output signal from the acousto-optic switch are merged by the fourth optical coupler, and first backscatter light and second backscatter light generated by the merged output signal being inputted to the calibration optical fiber are inputted via the circulator to the diversity device. The first backscatter light, the second backscatter light, the emitted light from the first laser, and the emitted light from the second laser that have undergone signal processing by the diversity device are sent via the digitizer to the CPU so as to be subjected to calculation processing.

Effect of the Invention

The optical fiber distribution measurement system according to the present disclosure can obtain a significant effect that it becomes possible to provide an optical fiber distribution measurement system and a signal processing method for optical fiber distribution measurement, in which DAS and DTSS based on TW-COTDR are combined, and, using a Rayleigh frequency shift measured by DTSS, a phase value in DAS is corrected at certain intervals longer than a measurement rate in the TW-COTDR method, thereby correcting error due to a Rayleigh scattering light shift which changes with a longer cycle than the DAS measurement rate, thus achieving measurement stability in DAS over a long period.

DESCRIPTION OF EMBODIMENTS

Embodiment 1

Hereinafter, an example of an optical fiber distribution measurement system according to embodiment 1 of the present disclosure will be described with reference to the drawings.

Figure 4:
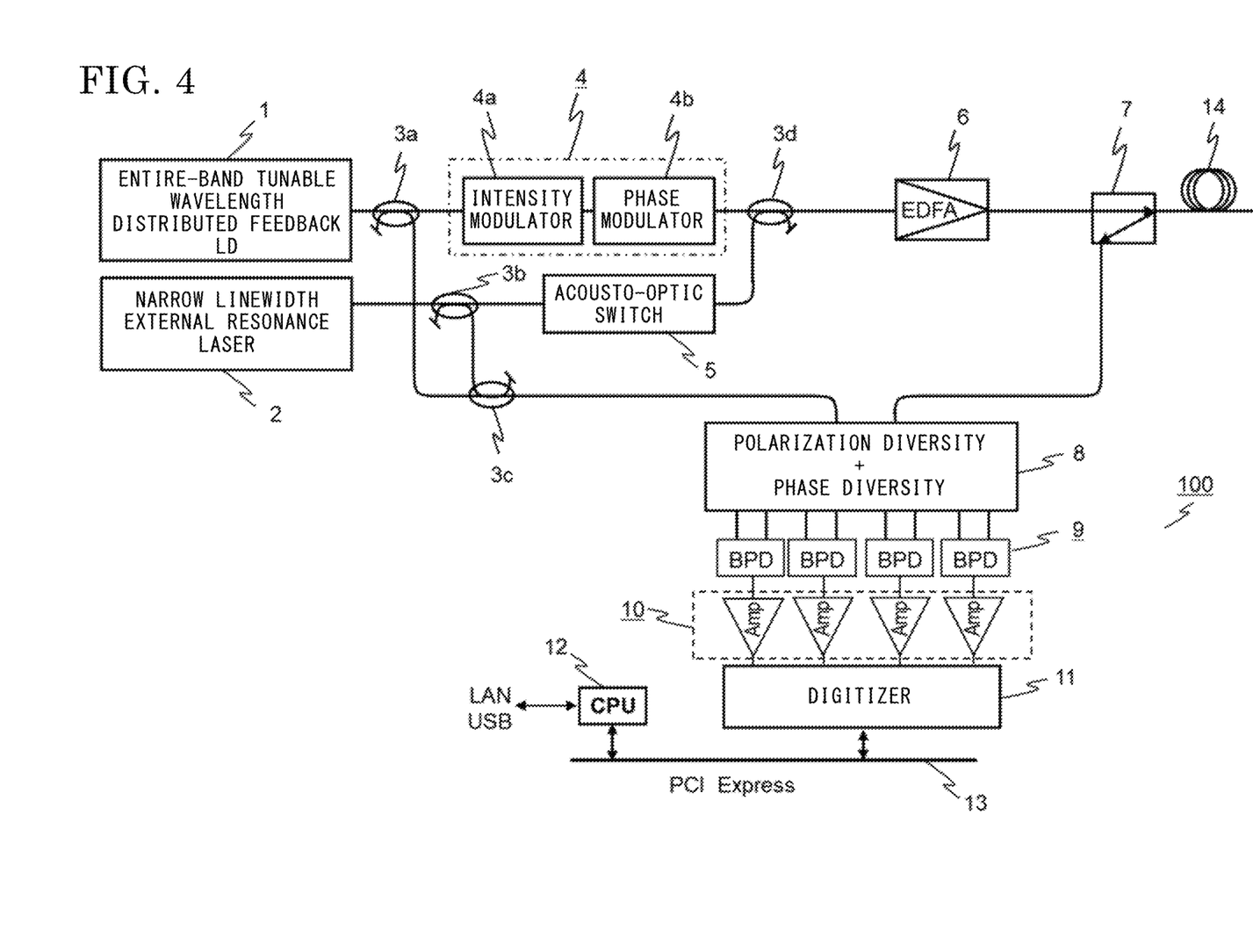
FIG. 4 is a diagram showing an example of a system configuration of an optical fiber distribution measurement system according to embodiment 1.

FIG. 4 is a diagram showing an example of a system configuration of an optical fiber distribution measurement system 100 according to embodiment 1. Laser light emitted from a tunable wavelength distributed feedback LD 1 (hereinafter, may be referred to as first laser) of TW-COTDR type passes through a first coupler 3a which is an optical device for branching or merging light, to undergo coding processing by a pulse compression coding circuit 4 including an intensity modulator 4a and a phase modulator 4b, and then is inputted to a third coupler 3c. In this case, in the pulse compression coding circuit 4, the laser light is first inputted to the intensity modulator 4a so that the intensity thereof is modulated by the intensity modulator 4a, and then the resultant signal is outputted from the intensity modulator 4a. Thereafter, the signal outputted from the intensity modulator 4a is inputted to the phase modulator 4b, the inputted signal is subjected to phase modulation by the phase modulator 4b, and then the resultant signal is outputted. That is, the signal that has undergone coding processing by the pulse compression coding circuit 4 is outputted. Then, the output signal is inputted to a fourth coupler 3d.

Here, the tunable wavelength distributed feedback LD 1 is a light source in which the wavelength is tunable (1553.5 to 1561.5 nm) over the entire band, and the wavelength range thereof is several tens of nm and the linewidth thereof is 1 MHz.

In the coding processing by the pulse compression coding circuit 4, Barker Code which can improve both of the spatial resolution and the S/N ratio is used. That is, a pulse having a pulse width Pw is divided into n sub-pulses (sub-pulse width: SPw=Pw/n), the phase of each sub-pulse is modulated with a random binary code string, and the resultant signal is transmitted.

On the other hand, an external resonance laser 2 (hereinafter, may be referred to as second laser) which is a light source for DAS has a fixed wavelength (1550.2 nm), and has a linewidth less than 2 KHz. Laser light emitted from the external resonance laser 2 passes through a second coupler 3b, to be inputted to an acousto-optic switch 5 which generates pulse light with high intensity. Thereafter, the signal is inputted to the third coupler 3c, and then is inputted to a diversity device 8 which is a device for improving the quality or reliability of the signal by preferentially using an excellent signal or combining received signals to remove noise. The diversity device 8 improves the qualities of signals of polarization and phase or improves the reliability thereof.

It is noted that the tunable wavelength distributed feedback LD 1 which is a light source of TW-COTDR type and the external resonance laser 2 which is a light source for DAS each require signals for four channels.

The signal that has undergone pulse compression coding, outputted from the pulse compression coding circuit 4, passes through a fourth coupler 3d together with the signal outputted from the acousto-optic switch 5, to be inputted to an erbium doped fiber amplifier (EDFA) 6 which is a kind of optical fiber amplifier. After the signals are outputted from the EDFA 6, the signals pass through a circulator 7 for separating two or more signals that advance in directions opposite to each other, and then are inputted to the aforementioned diversity device 8. It is noted that a calibration optical fiber 14 is connected to one output end of the circulator 7.

The signals (two kinds of polarization signals×two kinds of phase signals) for four channels (hereinafter, abbreviated as 4CH), which have been improved in quality by the diversity device 8 and are outputted from the diversity device 8, are separately inputted to four balanced photo diodes 9 (hereinafter, abbreviated as BPD), and then are separately inputted to four amplifiers 10 having a reception band greater than 500 MHz, so that the signals are amplified. Then, the amplified signals are inputted to a digitizer 11 for 4CH. It is noted that, in principle, there is no problem even if the four amplifiers are not provided. The digitizer 11 for 4CH is connected to a PCI-Express 13 which is a kind of extension bus, e.g., an input/output serial interface shared with a CPU 12 which is a controller.

Figure 5:
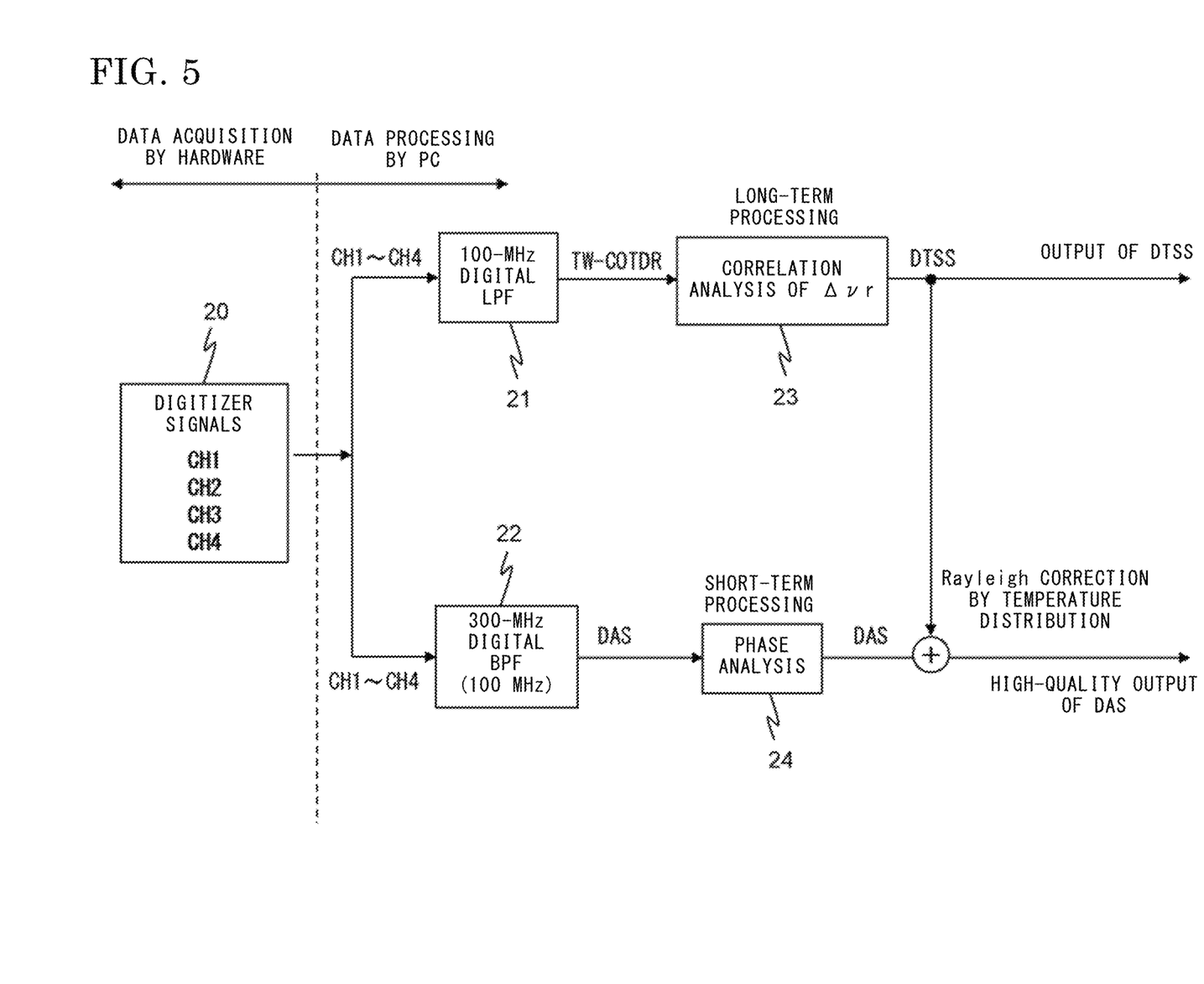
FIG. 5 is a diagram illustrating a correction method for a DAS signal in the optical fiber distribution measurement system according to embodiment 1.

FIG. 5 is a diagram illustrating flow of signal processing in the optical fiber distribution measurement system according to embodiment 1.

In FIG. 5, the area at the left of a dotted line indicates acquisition, by hardware, of digitizer signals for 4CH (CH1 to CH4) outputted from the digitizer 11 for 4CH provided at the final stage of signal output in constituent components of the optical fiber distribution measurement system shown in FIG. 4.

In FIG. 5, the area at the right of the dotted line indicates the details of data processing by a personal computer (PC) which is shown as the CPU 12 in FIG. 4. In the area at the right of the dotted line, an upper line indicates a line for analyzing long-term change, i.e., gradual change in physical phenomenon, and a lower line indicates a line for analyzing a short-term physical phenomenon.

Specifically, in the upper line, a 100-MHz digital LPF 21 (LPF is abbreviation of Low Pass Filter) processes, by TW-COTDR, only a low-frequency component of Rayleigh scattering light (frequency) shift components of the digitizer signals 20 for 4CH described above, and a change Δvr of this frequency shift component is subjected to correlation analysis 23 over a long period (30 seconds to several minutes), to obtain DTSS output. It is noted that the correlation analysis 23 may be performed over several years, if necessary.

Here, the reason for performing the correlation analysis will be described below. In the coding processing by the pulse compression coding circuit 4, the pulse having the pulse width Pw is divided into n sub-pulses (sub-pulse width: SPw=Pw/n), the phase of each sub-pulse is modulated by a random binary code string (more specifically, of such binary code strings, a Barker code that minimizes the magnitudes of side lobes of an autocorrelation function described below is used), and the resultant signal is transmitted.

In this case, in theory, by calculating a cross-correlation function of the transmitted signal and a reflection signal reflected by a target, a peak time position thereof, i.e., time delay can be calculated. Thus, a delay time shorter than in the case of not dividing the pulse into sub-pulses can be calculated, whereby an effect of improving spatial resolution is obtained.

In an actual device, instead of calculation of the cross-correlation function, calculation of an autocorrelation function of the transmitted signal is performed, whereby the same result can be obtained. That is, in the cross-correlation function, the transmitted signal f(t) (here, t is time) modulated by a random binary code string and a reflection signal reflected by a target are used. The reflection signal g(t) (here, t is time) is represented as g(t)=A×f(t−d), using the transmitted signal f(t), where A is an attenuation coefficient until the transmitted signal returns after being reflected by the target, and d is a delay time. Therefore, the cross-correlation function of the transmitted signal f(t) and the reflection signal g(t) can be obtained by calculating the autocorrelation function of the transmitted signal (e.g., the autocorrelation of the previous signal and the present signal).

The peak value of the autocorrelation function is about n times the amplitude of the original pulse signal, the value for S in the S/N ratio increases, and the peak width is 1/n of the original pulse width. That is, an effect of improving both the spatial resolution and the S/N ratio is obtained.

However, in the case of calculating the autocorrelation function by using the transmitted signal modulated with a random binary code string as described above, while the peak value of the autocorrelation function increases, there is a disadvantage that side lobes other than the peak value occur. In order to compensate for this disadvantage, a Barker code that minimizes side lobes of the autocorrelation function is used for the above coding (for the explanation thereof, see Non-Patent Literature 3, etc.).

On the other hand, in the lower line, using a signal extracted from the digitizer signals 20 for 4CH by a 300-MHz digital BPF 22 (BPF is abbreviation of Band Pass Filter; bandwidth is 100 MHz), a Rayleigh scattering light (phase) shift component is subjected to phase analysis 24 in which the processing can be performed in a short period (about 0.5 ms), by DAS, and thus a DAS output signal is obtained.

Next, as shown in the lower line in FIG. 5, calculation of adding the above calculated DTSS signal to the DAS output signal is performed. Here, as a premise for allowing calculation of combining the DAS signal and the DTSS signal as described above, it is necessary that the calculation is performed with signals complementary to each other. That is, it is required that optical signals that are sent from the same optical fiber and have the same phase can be received with the same reception condition and can be processed. The device or the data process shown in FIG. 4 and FIG. 5 satisfies the above condition.

Specifically, using a Rayleigh frequency measured by DTSS, the phase value of the DAS output signal is corrected at regular intervals, whereby a shift amount due to temperature change (due to change in measurement position) in the optical fiber is corrected. Thus, high-quality output of DAS can be obtained. In addition, in DTSS, long-term processing over several years can be performed, and therefore measurement stability in DAS over a long period can also be achieved.

Figure 6:
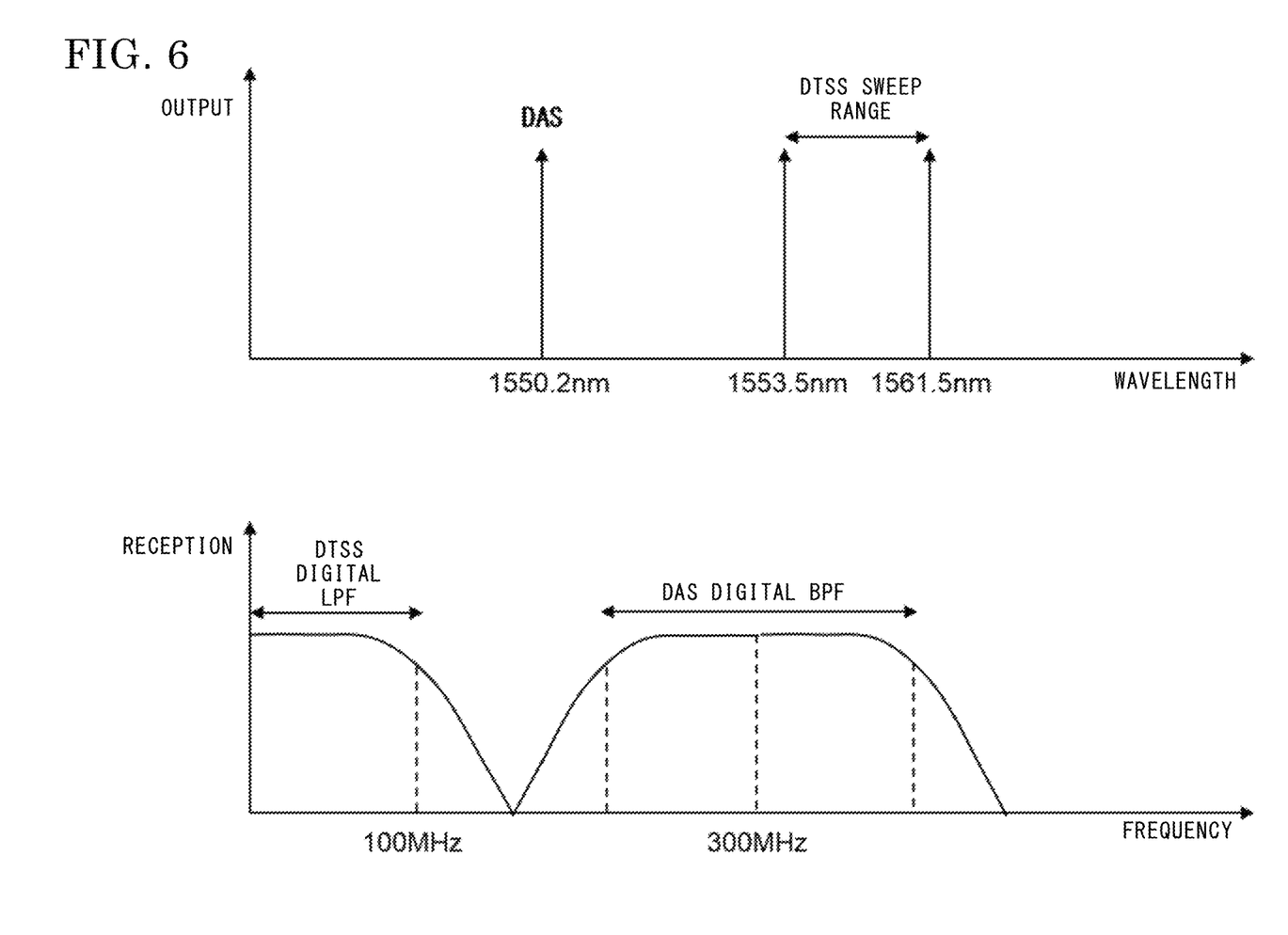
FIG. 6 illustrates setting of LD wavelengths in the optical fiber distribution measurement system according to embodiment 1.

FIG. 6 clearly illustrates the relationship between the wavelengths of optical outputs set in the system and the frequencies in a reception system, in the DAS measurement and the DTSS measurement described above.

As shown in FIG. 6, the wavelength of the optical output in DAS is fixed at 1550.2 nm, whereas the wavelength of the optical output in DTSS is tunable, and the sweep range thereof is 1554.5 nm to 1561.5 nm.

Regarding the frequencies in the reception system, in DTSS, a digital LPF is used and the cut-off frequency thereof is 100 MHz, and in DAS, a digital BPF is used and the bandwidth frequency ranges between ±100 MHz, with the center frequency being 300 MHz.

Figure 7:
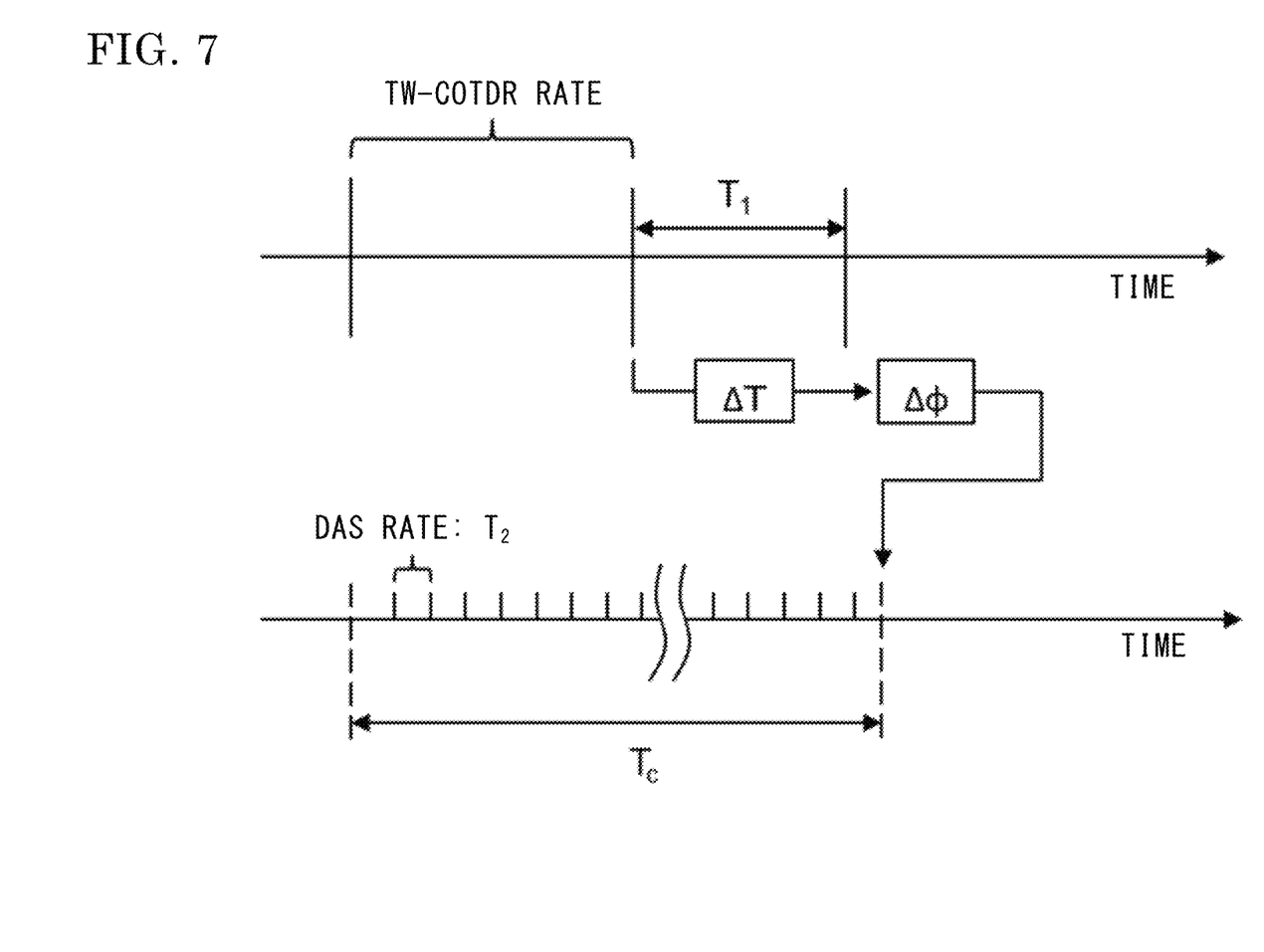
FIG. 7 illustrates a principle of phase correction using DTSS.

Next, with reference to FIG. 7, a distributed phase correction method will be described. The upper part in FIG. 7 shows the summary of measurement using TW-COTDR. A rate $T_1$ which corresponds to a measurement timing in TW-COTDR, shown in FIG. 7, is about 30 to 60 seconds. Through measurement with the rate $T_1$, a change amount $\Delta T$ due to change in the outside environment such as temperature is calculated, and the calculated change amount $\Delta T$ is converted to phase. The phase is added to the DAS measurement signal that has been measured, shown in the lower part in FIG. 7, whereby the original measured DAS signal is corrected. In this case, a DAS rate $T_2$ which corresponds to a measurement timing in DAS is about 0.5 ms within a time interval Tc (>$T_1$) which corresponds to the correction timing. That is, the time interval Tc for correcting the DAS signal by the DTSS signal is set to be greater than the rate $T_1$ in TW-COTDR. It is noted that the correction is performed for the entire optical fiber.

Figure 8:
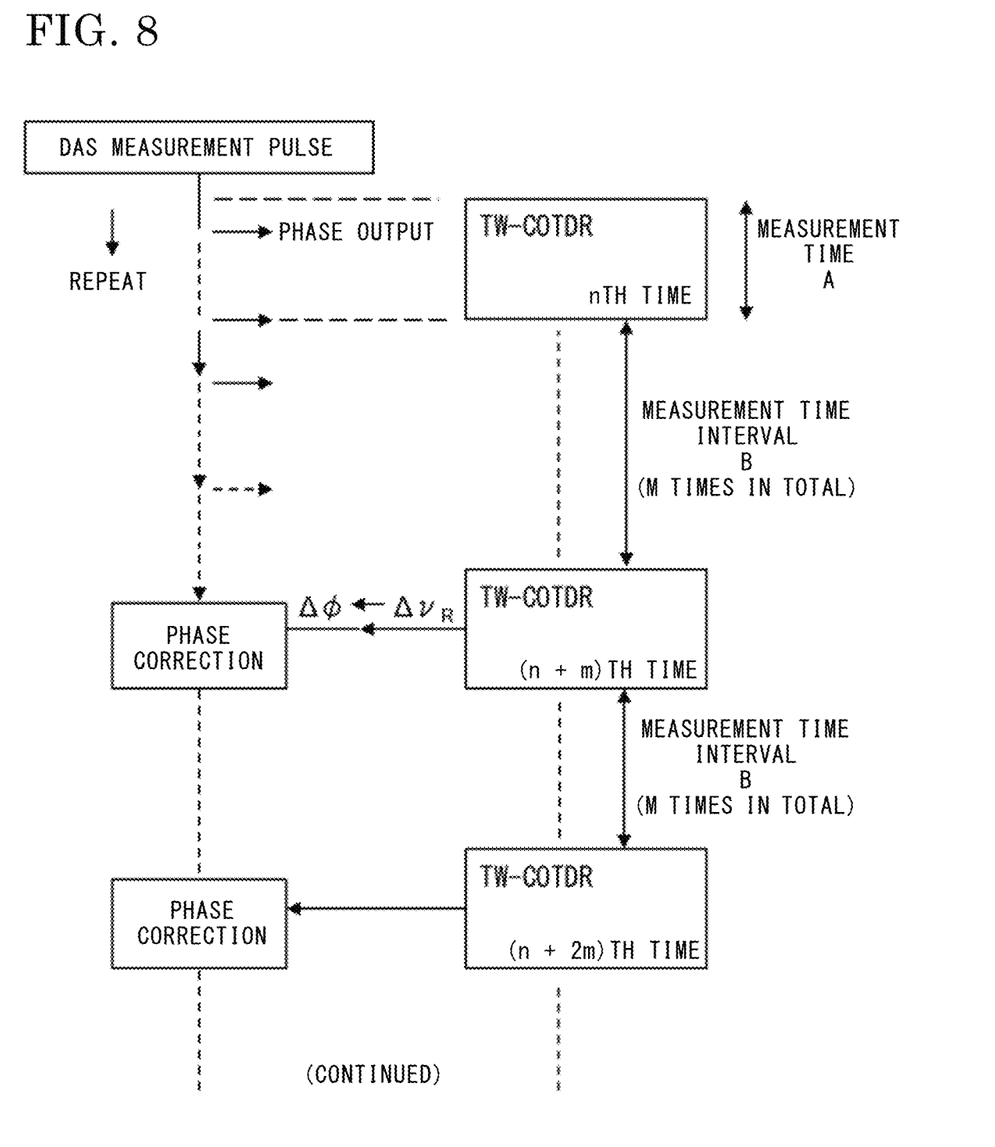
FIG. 8 shows an example of a signal processing method in the optical fiber distribution measurement system according to embodiment 1.

In the case of applying the measurement method shown in FIG. 7 to long-term measurement, a configuration as shown in FIG. 8 is used. FIG. 8 shows an example of the configuration of a signal processing model in the case of applying the optical fiber distribution measurement system according to embodiment 1 to long-term measurement.

In FIG. 8, a DAS measurement pulse corresponds to the DAS rate $T_2$ shown in FIG. 7, and is repeatedly outputted at a speed of 2 KHz or higher. The measured signal is outputted as a phase signal. Meanwhile, a DTSS signal obtained by correlation analysis using TW-COTDR during a measurement time A (A is about 30 to 60 seconds) is outputted. Regarding the measurement using TW-COTDR, after measurement has been performed n times, measurement is performed m times in total within a measurement time interval B. At each of the m measurements, a Rayleigh frequency shift signal $\Delta v_R$ of the outputted DTSS signal is converted to a phase amount $\Delta \varphi$, which is added to the DAS measurement signal, whereby the DAS measurement signal is corrected. The phase correction is continued in the same manner over a necessary correction period, whereby a signal that has undergone temperature correction or the like over a necessary period is obtained. Here, the measurement time interval B is about one hour, for example.

Figure 9:
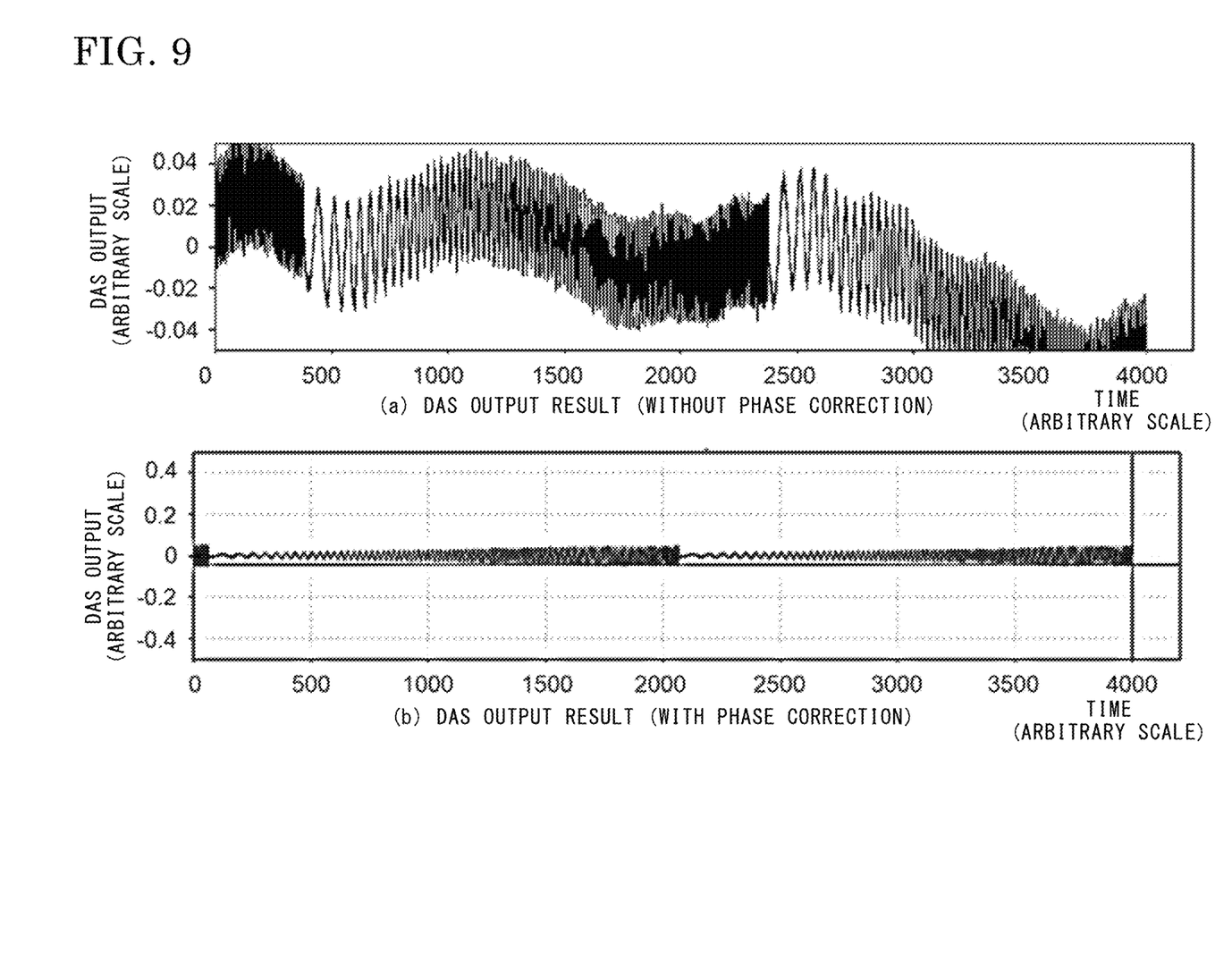
FIG. 9 shows an example of an outputted signal in the optical fiber distribution measurement system according to embodiment 1.

FIG. 9 (FIG. 9(a), FIG. 9(b)) shows an example of an outputted signal in the optical fiber distribution measurement system according to embodiment 1. In both of FIG. 9(a) and FIG. 9(b), the horizontal axis indicates time in arbitrary scale, and the vertical axis indicates DAS output in arbitrary scale. Each scale of the vertical axis and the horizontal axis is the same between both graphs. FIG. 9(a) shows a result of DAS output in the case of not performing phase correction by a DTSS signal, and FIG. 9(b) shows a result of DAS output in the case of performing phase correction by a DTSS signal.

In comparison between the output result shown in FIG. 9(a) and the output result shown in FIG. 9(b), it is clearly found that, in the case of performing phase correction, the amplitude of the signal during a specific time is smaller, and there is less change during the signal value with respect to time change (the average value of the signal during a predetermined time), that is, even if a shift occurs due to a factor that gradually varies over time, such as temperature change, performing phase correction by a DTSS signal reduces the amplitude of the signal during a predetermined time and can also suppress variation in the DAS output due to a factor that gradually varies over time. Thus, it has been found that, when phase correction by a DTSS signal is performed, a gradually varying shift amount of the DAS output is corrected, whereby measurement stability in DAS over a long period can be achieved.

Although the disclosure is described above in terms of an exemplary embodiment, it should be understood that the various features, aspects and functionality described in the embodiment are not limited in their applicability to the particular embodiment with which they are described, but instead can be applied alone or in various combinations to the embodiment of the disclosure.

It is therefore understood that numerous modifications which have not been exemplified can be devised without departing from the scope of the present disclosure. For example, at least one of the constituent components may be modified, added, or eliminated.

DESCRIPTION OF THE REFERENCE CHARACTERS 1 tunable wavelength distributed feedback LD
2 external resonance laser
3a first coupler
3b second coupler
3c third coupler
3d fourth coupler
4 pulse compression coding circuit
4a intensity modulator
4b phase modulator
5 acousto-optic switch
6 EDFA
7 circulator
8 diversity device
9 balanced photo diode
10 amplifier
11 digitizer
12 CPU
13 PCI-Express
14 calibration optical fiber
20 digitizer signal
21 100-MHz digital LPF
22 300-MHz digital BPF
23 correlation analysis
24 phase analysis
100 optical fiber distribution measurement system

The invention claimed is:

1. An optical fiber distribution measurement system comprising:
a first laser for obtaining a temperature-strain distribution measurement signal through analysis of a frequency shift of Rayleigh scattering light;
a second laser for obtaining an elastic wave measurement signal through analysis of a phase shift of Rayleigh scattering light;
first to fourth optical couplers for branching or merging laser light;
a pulse compression coding circuit including an intensity modulator for modulating an intensity of an optical signal and a phase modulator for modulating a phase of an optical signal, the intensity modulator and the phase modulator being connected in series;
an acousto-optic switch for generating pulse light;
a circulator for separating optical signals;
a calibration optical fiber for generating backscatter light by receiving laser light:
a diversity device for combining optical signals to remove noise;
a digitizer for converting an input signal to a discrete signal; and
a CPU which includes a processor and a storage device and which performs calculation on a signal and performs storage, wherein
emitted light from the first laser is branched by the first optical coupler, so as to be inputted to the pulse compression coding circuit and the third optical coupler,
emitted light from the second laser is branched by the second optical coupler, so as to be inputted to the acousto-optic switch and the third optical coupler,
the emitted light from the first laser and the emitted light from the second laser that have been inputted to the third optical coupler are inputted to the diversity device,
an output signal from the pulse compression coding circuit and an output signal from the acousto-optic switch are merged by the fourth optical coupler, and first backscatter light and second backscatter light generated by the merged output signal being inputted to the calibration optical fiber are inputted via the circulator to the diversity device, and
the first backscatter light, the second backscatter light, the emitted light from the first laser, and the emitted light from the second laser that have undergone signal processing by the diversity device are sent via the digitizer to the CPU so as to be subjected to calculation processing.

2. The optical fiber distribution measurement system according to claim 1, wherein
the first laser is a distributed feedback laser, and the second laser is an external resonance laser, and
through calculation on the discrete signal sent from the digitizer, the CPU converts an analyzed Rayleigh frequency shift signal obtained as the temperature-strain distribution measurement signal, to phase error, and corrects an analyzed phase signal obtained as the elastic wave measurement signal, by the phase error.

3. The optical fiber distribution measurement system according to claim 2, wherein
the elastic wave measurement signal is corrected by the phase error, at regular time intervals longer than a measurement rate of temperature-strain distribution measurement.

4. A signal processing method for optical fiber distribution measurement, using the optical fiber distribution measurement system according to claim 1, the method comprising:
directly inputting emitted light from the first laser and emitted light from the second laser, to the diversity device;
inputting, to the calibration optical fiber, a signal that has undergone coding processing through intensity modulation and phase modulation by the pulse compression coding circuit after emitted from the first laser, and a signal that has passed through the acousto-optic switch after emitted from the second laser;
inputting, to the diversity device, a signal of backscatter light of the signal inputted to the calibration optical fiber, and performing polarization processing and phase processing thereon by the diversity device;
performing discretization processing by the digitizer on each of a plurality of signals obtained by the polarization processing and the phase processing, and sending resultant signals to the CPU;
performing calculation on each signal that has undergone the discretization processing, by the CPU;
on the basis of a calculation result obtained through the calculation on each signal by the CPU, performing phase analysis of a phase shift of Rayleigh scattering light, to obtain an elastic wave measurement signal, and performing correlation analysis of a frequency shift of Rayleigh scattering light, to obtain a temperature-strain distribution measurement signal; and
correcting the elastic wave measurement signal on the basis of the temperature-strain distribution measurement signal.

5. A signal processing method for optical fiber distribution measurement, using the optical fiber distribution measurement system according to claim 2, the method comprising:

with use of two kinds of signals that are an elastic wave measurement signal obtained by analyzing a phase shift of Rayleigh scattering light measured in a measurement time of 1 millisecond or less, and a temperature-strain distribution measurement signal obtained by analyzing a frequency shift of Rayleigh scattering light measured in a measurement time of 30 seconds or more by tunable wavelength coherent optical time domain reflectometry, calculating the phase error from the temperature-strain distribution measurement signal, and correcting the elastic wave measurement signal by the phase error.

* * * * *